(12) United States Patent
Depondt et al.

(10) Patent No.: US 10,214,186 B2
(45) Date of Patent: Feb. 26, 2019

(54) WIPER BLADE DEVICE

(71) Applicant: Robert Bosch GmbH, Stuttgart (DE)

(72) Inventors: Helmut Depondt, Boutersem (BE); Qingyang Liu, Hunan (CN); Dirk Herinckx, Dries-Linter (BE); Koen Bex, Jeuk/Limburg Belgien (BE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/519,336

(22) PCT Filed: Sep. 21, 2015

(86) PCT No.: PCT/EP2015/071575
§ 371 (c)(1),
(2) Date: Apr. 14, 2017

(87) PCT Pub. No.: WO2016/058788
PCT Pub. Date: Apr. 21, 2016

(65) Prior Publication Data
US 2017/0240139 A1    Aug. 24, 2017

(30) Foreign Application Priority Data

Oct. 16, 2014  (DE) .................. 10 2014 220 989
Aug. 18, 2015  (DE) .................. 10 2015 215 704

(51) Int. Cl.
*B60S 1/38*    (2006.01)
*B60S 1/40*    (2006.01)

(52) U.S. Cl.
CPC .......... *B60S 1/3851* (2013.01); *B60S 1/3853* (2013.01); *B60S 1/3858* (2013.01); *B60S 1/3881* (2013.01)

(58) Field of Classification Search
CPC .... B60S 1/3851; B60S 1/3853; B60S 1/3858; B60S 1/3874; B60S 1/3877; B60S 1/3881
(Continued)

(56) References Cited

U.S. PATENT DOCUMENTS 6,634,055 B1 * 10/2003 De Block ............. B60S 1/3858
                                                    15/250.32
2003/0213089 A1 * 11/2003 Merkel .................... B60S 1/38
                                                    15/250.32
(Continued)

FOREIGN PATENT DOCUMENTS

DE        10036115    *  1/2003
DE      102009000864     8/2010
(Continued)

OTHER PUBLICATIONS

International Search Report for Application No. PCT/EP2015/071575 dated Nov. 30, 2015 (English Translation, 2 pages).

*Primary Examiner* — Gary K. Graham
(74) *Attorney, Agent, or Firm* — Michael Best & Friedrich LLP

(57) ABSTRACT

The invention relates to a wiper blade device, comprising a wiper blade adapter (10; 10a; 10b), which has at least two locking means (12; 12a; 12b, 14; 14a; 14b), which are arranged at an offset from each other in a wiper blade longitudinal direction (16; 16a; 16b), and comprising at least one spring rail (18; 18a; 18b), which has at least two locking cut-outs (20; 20a; 20b, 22; 22a; 22b), which are arranged at an offset from each other in the wiper blade longitudinal direction (16; 16a; 16b), wherein the at least two locking means (12; 12a; 12b, 14; 14a; 14b) are provided for engaging in the at least two locking cut-outs (20; 20a; 20b, 22; 22a; 22b) of the at least one spring rail (18; 18a; 18b) in an assembled state.

16 Claims, 7 Drawing Sheets

(58) Field of Classification Search
USPC .................................................. 15/250.32
See application file for complete search history.

(56) References Cited

U.S. PATENT DOCUMENTS

| | | |
|---|---|---|
| 2010/0242204 A1 | 9/2010 | Chien |
| 2013/0192016 A1* | 8/2013 | Kim .................. B60S 1/3858 15/250.201 |
| 2013/0333147 A1 | 12/2013 | Bex et al. |
| 2014/0143970 A1* | 5/2014 | Baumert ............. B60S 1/3853 15/250.32 |

FOREIGN PATENT DOCUMENTS

| | | |
|---|---|---|
| DE | 102010062899 | 6/2012 |
| DE | 102011078174 | 1/2013 |
| KR | 20130119552 | 11/2013 |

* cited by examiner

WIPER BLADE DEVICE

BACKGROUND OF THE INVENTION

A wiper blade device having a wiper blade adapter which comprises at least two detent means which are arranged offset with respect to one another in a wiper blade longitudinal direction, and having at least one spring rail which comprises at least two detent recesses which are arranged offset with respect to one another in the wiper blade longitudinal direction, wherein the at least two detent means are provided for engaging, in an assembled state, into the at least two detent recesses of the at least one spring rail, has already been proposed.

SUMMARY OF THE INVENTION

The invention is based on a wiper blade device having a wiper blade adapter which comprises at least two detent means which are arranged offset with respect to one another in a wiper blade longitudinal direction, and having at least one spring rail which comprises at least two detent recesses which are arranged offset with respect to one another in the wiper blade longitudinal direction, wherein the at least two detent means are provided for engaging, in an assembled state, into the at least two detent recesses of the at least one spring rail. In this way, it is possible to realize a particularly secure fastening of the at least one spring rail to the wiper blade adapter. In this context, a "wiper blade adapter" is to be understood in particular to mean an adapter which has a contact region with respect to a wiper blade component and which is captively connected to the wiper blade component and which is provided for providing a coupling region of the wiper blade component for establishing coupling to and/or contact with a wiper arm adapter.

In this context, a "wiper arm adapter" is to be understood in particular to mean an adapter which has a contact region with respect to a wiper arm component and which is captively connected to the wiper arm component and which is provided for providing a coupling region of the wiper arm component for establishing coupling to and/or contact with a wiper blade adapter. In this context, a "detent means" is to be understood in particular to mean a resiliently elastic means for producing a detent connection, which means is provided for being deflected elastically out of an initial position during an assembly process. The detent means is preferably provided for being moved back into the initial position with resiliently elastic action when a final assembly position is reached. In this context, a "wiper blade longitudinal direction" is to be understood in particular to mean a direction which runs at least substantially parallel to a main longitudinal extent of the wiper blade device. In this context, "at least substantially" is to be understood in particular to encompass a deviation of less than 25°, preferably of less than 10°, particularly preferably of less than 5°.

A "spring rail" is to be understood in particular to mean a macroscopic element, which element has at least an extent which, in a normal operating state, is elastically variable by at least 10%, in particular by at least 20%, preferably by at least 30% and particularly advantageously by at least 50%, and which element in particular generates an opposing force which is dependent on a variation of the extent and which is preferably proportional to the variation and which counteracts the variation. The spring rail is preferably at least partially formed from a spring steel or from a coated spring steel. The spring rail is preferably, in an unloaded state, substantially in the form of a curved bar and particularly advantageously of a flattened curved bar. A curvature of the spring rail along a longitudinal extent in an unloaded state is particularly advantageously greater than a curvature of a vehicle surface of a motor vehicle, in particular of a vehicle window, over which the spring rail is guided in at least one operating state. An "extent" of an element is to be understood in particular to mean a maximum spacing between two points of a vertical projection of the element onto a plane. A "macroscopic element" is to be understood in particular to mean an element with an extent of at least 1 mm, in particular of at least 5 mm and preferably of at least 10 mm. In this context, a "detent recess" is to be understood in particular to mean a recess which is provided for receiving at least one detent means. "Provided" is to be understood in particular to mean specially designed and/or equipped. The statement that an object is provided for a particular function is to be understood in particular to mean that the object performs and/or carries out said particular function in at least one state of use and/or operating state.

In a further embodiment of the invention, it is proposed that the at least two detent means comprise in each case one deflection means, which deflection means are arranged offset with respect to one another in the wiper blade longitudinal direction. In this way, it is advantageously possible to realize a uniform force distribution within the wiper blade adapter. Furthermore, an inadvertent detachment of the at least one spring rail from the wiper blade adapter can be avoided. In this context, a "deflection means" is to be understood in particular to be a means which is provided for being deflected in resiliently elastic fashion. In particular, one end of the deflection means is fixedly arranged on the wiper blade adapter, and another end of the deflection means is movable relative to the wiper blade adapter.

It is furthermore proposed that the at least two detent means comprise in each case one deflection means, which deflection means are arranged on different receiving sides, which face toward one another, of the wiper blade adapter. In this way, it is possible to realize a particularly secure locking of the at least one spring rail with detent action within the wiper blade adapter.

It is furthermore proposed that the wiper blade adapter comprises at least one first guide groove which, viewed in the wiper blade longitudinal direction, extends as far as between the at least two detent means. In this way, it is possible to realize particularly secure mounting of the at least one spring rail. The at least one first guide groove preferably has a groove width which corresponds to a thickness of the at least one spring rail.

It is furthermore proposed that the wiper blade adapter comprises at least one second guide groove which, viewed in the wiper blade longitudinal direction, extends as far as between the at least two detent means. In this way, it is possible to realize particularly secure mounting of the at least one spring rail. The at least one second guide groove preferably has a groove width which corresponds to a thickness of the at least one spring rail.

It is furthermore proposed that the wiper blade adapter, between the at least two detent means as viewed in the longitudinal direction, engages around the at least one spring rail at both sides in at least one plane. In this way, a particularly stable fastening of the at least one spring rail and a good wiping result can be achieved. The wiper blade adapter is preferably provided for preventing a movement of the spring rail in a vertical direction, in particular in a region which, viewed in the longitudinal direction, is arranged between the at least two detent means.

It is furthermore proposed that the at least two detent means are provided for being deflected in different directions. In this way, the at least one spring rail can be mounted in a particularly secure manner. The different directions are advantageously at least intermittently oriented oppositely to one another.

It is furthermore proposed that the at least two detent recesses of the at least one spring rail are arranged on mutually averted sides of the at least one spring rail. In this way, it is possible for forces to be transmitted between the at least one spring rail and the wiper blade adapter in a particular uniform manner. In particular, the at least two detent recesses of the at least one spring rail are formed into mutually averted sides.

It is furthermore proposed that the at least two detent recesses are arranged axially symmetrically with respect to a central axis of rotation. In this way, a particularly uniform force distribution in the wiper blade adapter can be achieved. Owing to the symmetrical design, it is furthermore possible for a risk of erroneous assembly to be advantageously reduced. A "central axis of rotation" is to be understood in this context in particular to mean an imaginary axis of rotation which runs at least substantially through a center of gravity of the at least one spring rail and at least substantially perpendicular to a spring rail surface. In this context, "at least substantially" is to be understood in particular to mean with a maximum offset of 10 mm, preferably with a maximum offset of 5 mm, particular preferably with a maximum offset of 0.1 mm.

It is furthermore proposed that the wiper blade device comprises a wind deflector unit which has a spring rail channel which is provided for accommodating the at least one spring rail. In this way, the wiper blade device can be made particularly resistant to torsion. In this context, a "wind deflector unit" is to be understood in particular to mean a unit which is provided for deflecting an airflow or relative wind acting on the wiper blade device and/or utilizing said air flow or relative wind for pressing the wiper blade device against a surface for wiping. The wind deflector unit is preferably composed at least partially of rubber and/or of an at least partially elastic plastic. The wind deflector unit preferably has at least one concave flow impingement surface. In particular, the wind deflector unit differs from an end cap, a wiper lip and/or from the wiper blade adapter. The wind deflector unit advantageously extends, in an operating state, over at least a major part of a longitudinal extent of the wiper blade device. The wind deflector unit preferably has at least one holding element for fastening to a spring rail and/or to a wiper strip.

A wiper blade adapter of a wiper blade device is also proposed.

Here, it is not the intention for the wiper blade device according to the invention to be restricted to the usage and embodiment described above. In particular, the wiper blade device according to the invention may, in order to perform a function described herein, have a number of individual elements, components and units which differs from a number mentioned herein.

BRIEF DESCRIPTION OF THE DRAWINGS

Further advantages will emerge from the following description of the drawing. The drawing illustrates three exemplary embodiments of the invention. The drawing, description and the claims contained numerous features in combination. A person skilled in the art will expediently also consider the features individually and combine them to form further meaningful combinations.

In the drawing.

DETAILED DESCRIPTION

Figure 1:
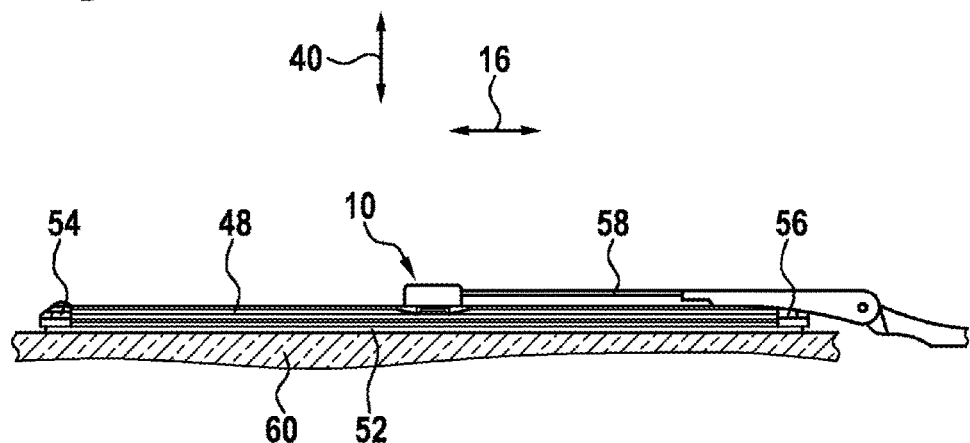
FIG. 1 shows a wiper blade device according to the invention in a side view.

FIG. 1 shows a wiper blade device having a wiper blade adapter 10, having a wind deflector unit 48, having a wiper lip 52 and having two end caps 54, 56. Furthermore, FIG. 1 shows a wiper arm 58 which is coupled to the wiper blade adapter 10 by means of a wiper arm adapter (not shown in any more detail). The wiper blade device is provided for cleaning a vehicle window 60. For this purpose, the wiper lip 52 lies against the vehicle window 60. During wiping operation, the wiper lip 52 sweeps across the vehicle window 60, whereby the vehicle window 60 is cleaned. The wiper blade device is formed by a flat wiper blade device. The wind deflector unit 48 extends over a major part of a main longitudinal extent of the wiper blade device. The end caps 54, 56 form terminations of the wind deflector unit 48 at free ends.

Figure 2:
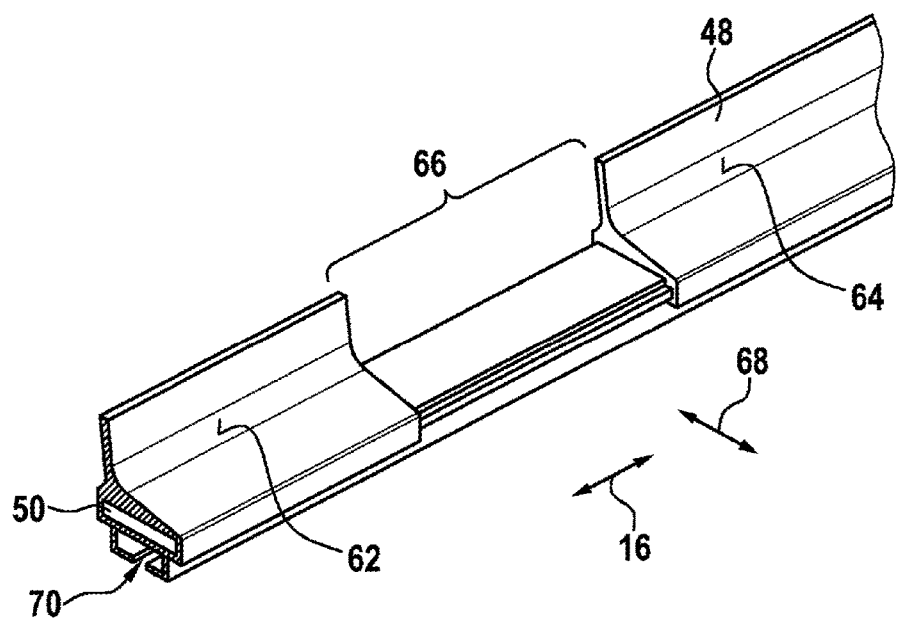
FIG. 2 shows a wind deflector unit of the wiper blade device in a perspective partial section.

FIG. 2 shows the wind deflector unit 48 in more detail. The wind deflector unit 48 is formed in one piece. The wind deflector unit 48 has two concavely curved wind deflection surfaces 62, 64. The wind deflection surfaces 62, 64 are separated from one another by an adapter receiving region 66. The adapter receiving region 66 is provided for receiving the wiper blade adapter 10. At a side facing toward the vehicle window, the wind deflector unit 48 has a wiper lip receiving profile 70 which is provided for receiving the wiper lip 52. The wind deflector unit 48 has a spring rail channel 50. The spring rail channel 50 is of closed form in the region of the wind deflection surfaces 62, 64. In the adapter receiving region 66, the spring rail channel 50 is open in a wiping direction 68. The spring rail channel 50 is provided for receiving a spring rail 18 of the wiper blade device.

Figure 3:
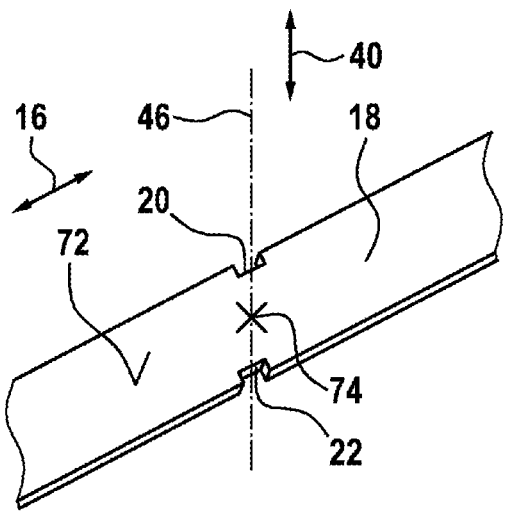
FIG. 3 shows a spring rail of the wiper blade device in a perspective partial illustration.

A central region of the spring rail 18 is illustrated in FIG. 3. The wiper blade device has exactly one spring rail 18. The spring rail 18 is formed in one piece. The spring rail 18 is formed from a coated spring steel. In an unloaded state, the spring rail 18 is substantially in the shape of a flattened curved bar. The spring rail 18 comprises two detent recesses 20, 22. The detent recesses 20, 22 are arranged offset with respect to one another in a wiper blade longitudinal direction 16. A plane moving in the wiper blade longitudinal direction 16 and extending perpendicular to the wiper blade longitudinal direction 16 firstly intersects one detent recesses 20, then neither of the detent recesses 20, 22, and finally the other detent recess 22.

The wiper blade longitudinal direction 16 runs parallel to a main direction of extent of the spring rail 18. The detent recesses 20, 22 do not intersect any common plane oriented perpendicular to the wiper blade longitudinal direction 16. The detent recesses 20, 22 are arranged on mutually averted sides of the spring rail 18. The detent recesses 20, 22 are arranged axially symmetrically with respect to one another relative to a central axis of rotation 46. The central axis of rotation 46 runs through a center of gravity 74 of the spring rail 18 and is oriented perpendicular to a spring rail surface 72.

Figure 4:
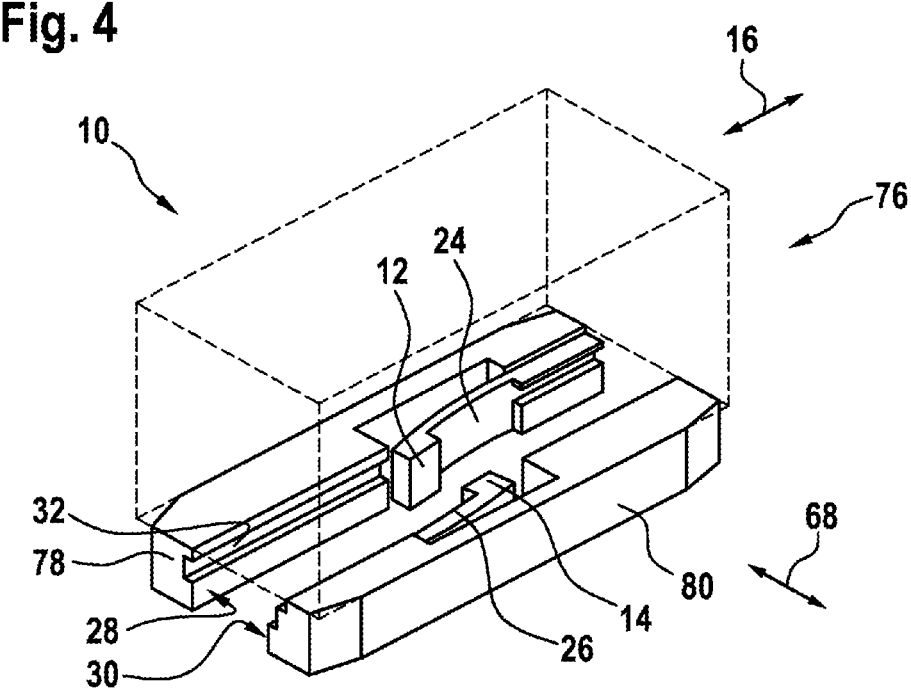
FIG. 4 shows a wiper blade adapter of the wiper blade device in a perspective partial illustration.
Figure 5:
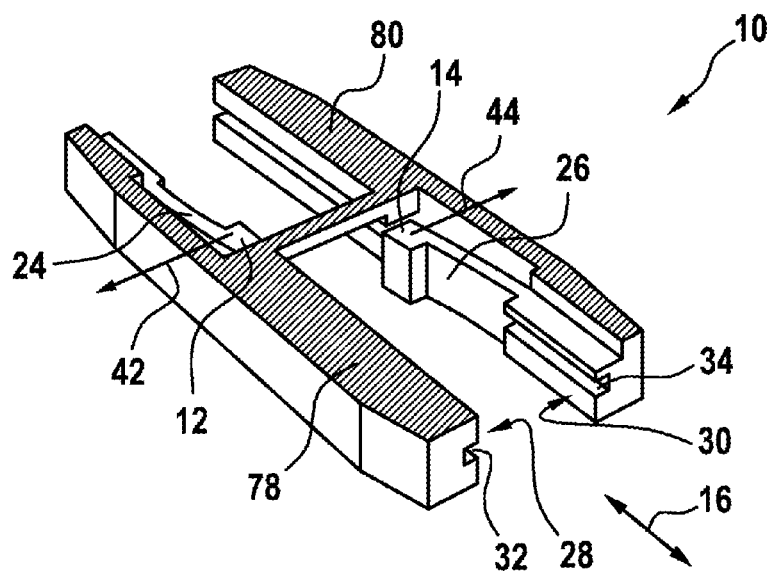
FIG. 5 shows the wiper blade adapter and a perspective partial view.

FIGS. 4 and 5 schematically show the wiper blade adapter 10. A coupling region 76 of the wiper blade adapter 10 for the coupling of the wiper arm 58 is not shown in detail. Various structural embodiments known from the prior art are conceivable for the coupling region 76. The wiper blade adapter 10 comprises two detent means 12, 14. The detent means 12, 14 are arranged offset with respect to one another in the wiper blade longitudinal direction 16. A plane moving in the wiper blade longitudinal direction 16 and extending perpendicular to the wiper blade longitudinal direction 16 firstly intersects one detent means 12, then neither of the detent means 12, 14, and finally the other detent means 14. The detent means 12, 14 are provided for being deflected in different directions 42, 44. The different directions 42, 44 are oriented substantially oppositely to one another.

The two detent means 12, 14 comprise in each case one deflection means 24, 26. The deflection means 24, 26 are arranged offset with respect to one another in the wiper blade longitudinal direction 16. The deflection means 24, 26 are deflectable in resiliently elastic fashion. The deflection means 24, 26 are arranged on lateral limbs 78, 80 of the wiper blade adapter 10. The deflection means 24, 26 are arranged on different receiving sides 28, 30, which face toward one another, of the wiper blade adapter 10. The receiving sides 28, 30 are arranged on the limbs 78, 80.

The wiper blade adapter 10 furthermore has a first guide groove 32 and a second guide groove 34. The guide grooves 32, 34 are provided for the mounting of the spring rail 18 in each case in regions over a longitudinal extent of the wiper blade adapter 10. The guide grooves 32, 34 have, in each case throughout, a groove width which corresponds to a thickness of the spring rail 18. The first guide groove 32 extends, as viewed in the wiper blade longitudinal direction 16, as far as between the detent means 12, 14. The second guide groove 34 extends, as viewed in the wiper blade longitudinal direction 16, as far as between the detent means 12, 14.

Figure 6:
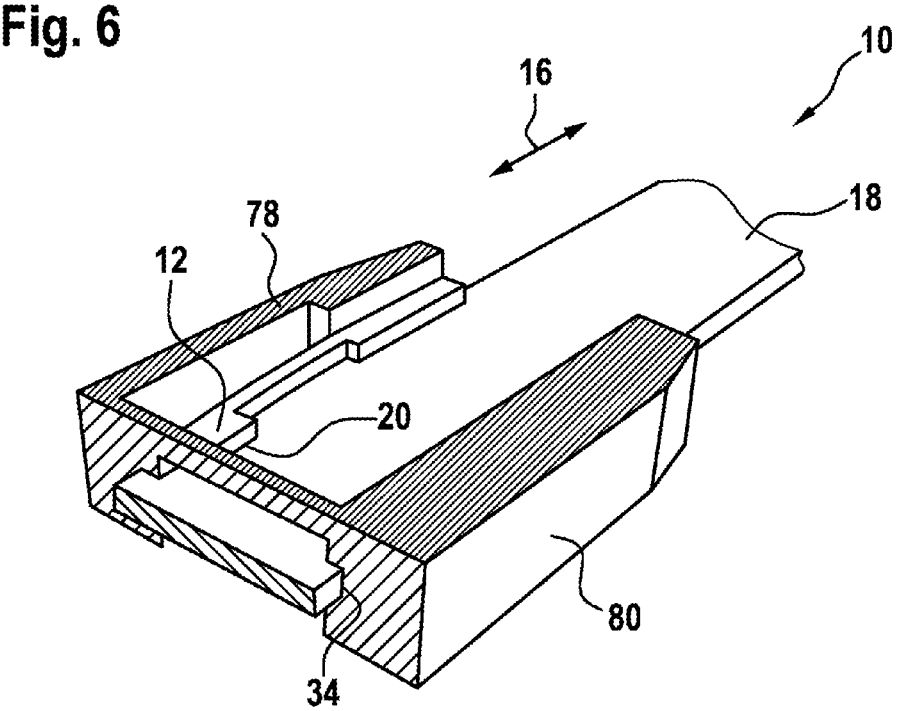
FIG. 6 shows the wiper blade adapter and the spring rail in a perspective partial section.
Figure 7:
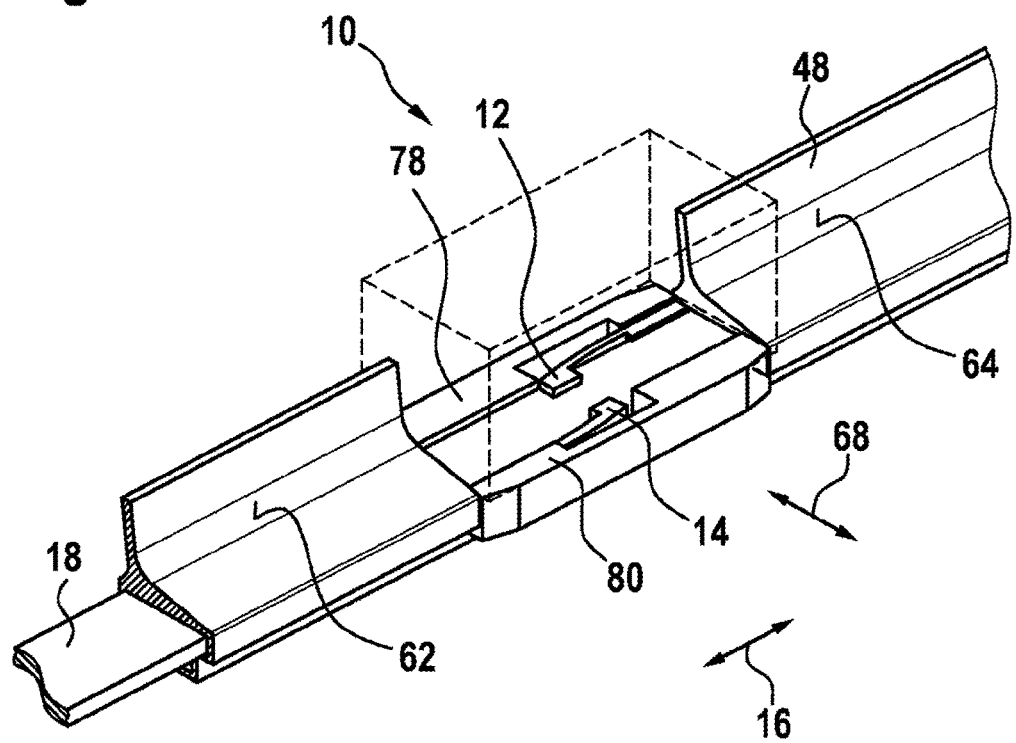
FIG. 7 shows the wiper blade device in a perspective partial section.

As shown in FIG. 6, the detent means 12, 14 are provided for engaging, in an assembled state, into the detent recesses 20, 22 of the spring rail 18. Before installation of the spring rail 18, the deflection means 24, 26 are deflected, and the wiper blade adapter 10 is placed onto the wind deflector unit 48 in the adapter receiving region 66. The spring rail 18 is pushed into the spring rail channel 50 until the detent means 12, 14 engage into the detent recesses 20, 22 (FIG. 7). After installation, the spring rail 18 lies in the guide grooves 32, 34. The wiper blade adapter 10 is, in the assembled state, fixedly coupled to the wind deflector unit 48 by means of the spring rail 18.

FIGS. 8 to 13 show two further exemplary embodiments of the invention. The following descriptions are restricted substantially to the differences between the exemplary embodiments, wherein, with regard to components, features and functions that remain unchanged, reference may be made to the description of the other exemplary embodiments, in particular of FIGS. 1 to 7. For better distinction between the exemplary embodiments, the alphabetic characters a and b have been added to the reference designations of FIGS. 8 to 13 in the further exemplary embodiments. With regard to identically designated components, in particular with regard to components with identical reference designations, reference may basically also be made to the drawings and/or the description of the other exemplary embodiments, in particular of FIGS. 1 to 7.

Figure 8:
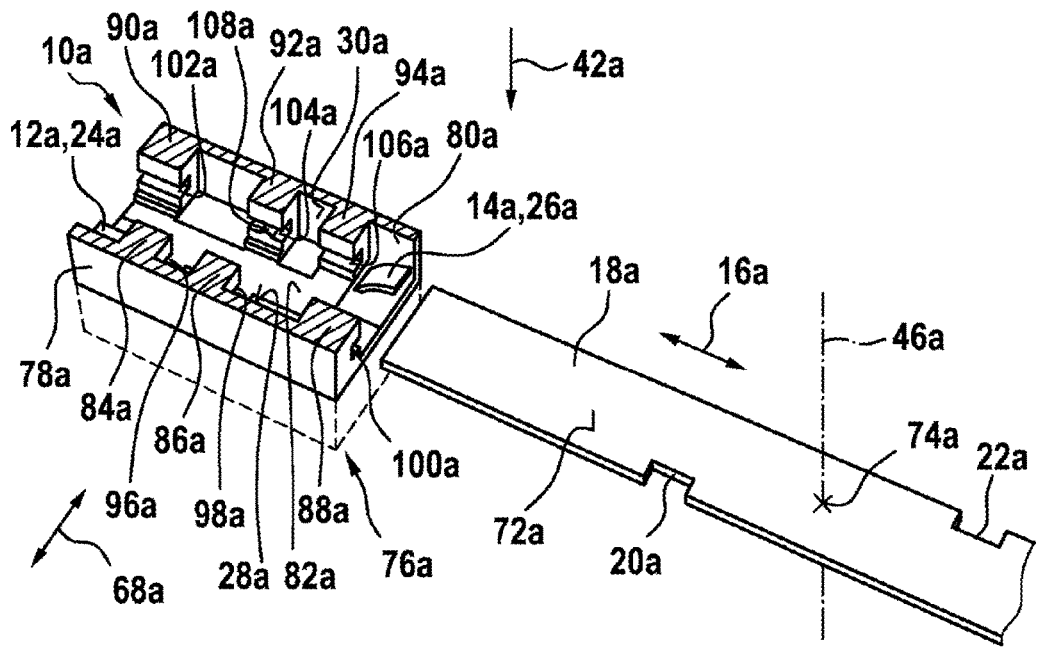
FIG. 8 shows a second exemplary embodiment of a wiper blade device in a perspective partial section.

FIG. 8 illustrates a second exemplary embodiment of a wiper blade device having a wiper blade adapter 10a and having a spring rail 18a. The wiper blade device has exactly one spring rail 18a. The spring rail 18a is formed in one piece. The spring rail 18a is formed from a coated spring steel. In an unloaded state, the spring rail 18a is substantially in the shape of a flattened curved bar. The spring rail 18a comprises two detent recesses 20a, 22a. The detent recesses 20a, 22a are arranged offset with respect to one another in a wiper blade longitudinal direction 16a. A plane moving in the wiper blade longitudinal direction 16a and extending perpendicular to the wiper blade longitudinal direction 16a firstly intersects one detent recess 20a, then neither of the detent recesses 20a, 22a, and finally the other detent recess 22a.

The wiper blade longitudinal direction 16a runs parallel to a main direction of extent of the spring rail 18a. The detent recesses 20a, 22a do not intersect any common plane oriented perpendicular to the wiper blade longitudinal direction 16a. The detent recesses 20a, 22a are arranged on mutually averted sides of the spring rail 18a. The detent recesses 20a, 22a are arranged axially symmetrically with respect to one another relative to a central axis of rotation 46a. The central axis of rotation 46a runs through a center of gravity 74a of the spring rail 18a and is oriented perpendicular to a spring rail surface 72a.

A coupling region 76a of the wiper blade adapter 10a for the coupling of the wiper arm 58 shown in the first exemplary embodiment is not shown in detail. Various structural embodiments known from the prior art are conceivable for the coupling region 76a. The wiper blade adapter 10a comprises two detent means 12a, 14a. The detent means 12a, 14a are arranged offset with respect to one another in the wiper blade longitudinal direction 16a. A plane moving in the wiper blade longitudinal direction 16a and extending perpendicular to the wiper blade longitudinal direction 16a firstly intersects one detent means 12a, then neither of the detent means 12a, 14a, and finally the other detent means 14a. The detent means 12a, 14a are provided for being deflected in the same direction 42a, which in an assembled state runs at least substantially parallel to a central axis of rotation 46a.

The two detent means 12a, 14a comprise in each case one deflection means 24a, 26a. The detent means 12a, 14a are in each case formed in one piece with the deflection means 24a, 26a. The deflection means 24a, 26a are arranged offset with respect to one another in the wiper blade longitudinal direction 16a. Viewed in a wiping direction 68a, the deflection means 24a, 26a are arranged offset with respect to one another.

The deflection means 24a, 26a are deflectable in resiliently elastic fashion. The deflection means 24a, 26a are formed so as to be pre-bent through at least substantially 90°. The deflection means 24a, 26a are arranged on a top wall 82a of the wiper blade adapter 10a. The top wall 82a connects lateral limbs 78a, 80a of the wiper blade adapter 10a to one another. The deflection means 24a, 26a project in each case at least substantially perpendicularly from the top wall 82a and then bend into an orientation at least substantially parallel to the wiper blade longitudinal direction 16a. Free ends of the detent means 12a, 14a point in the wiper blade longitudinal direction 16a. The free ends of the detent means 12a, 14a are averted from one another in this case. The detent means 12a, 14a form terminations of the wiper blade adapter 10a in the wiper blade longitudinal direction 16a.

Holding elements 84a, 86a, 88a, 90a, 92a, 94a for the mounting of the spring rail 18a are arranged on different receiving sides 28a, 30a, which face toward one another, of the wiper blade adapter 10a. The holding elements 84a, 86a, 88a, 90a, 92a, 94a are formed in one piece with the limbs 78a, 80a. In the holding elements 84a, 86a, 88a, 90a, 92a, 94a there is arranged in each case one guide groove 96a, 98a, 100a, 102a, 104a, 106a. The guide grooves 96a, 98a, 100a, 102a, 104a, 106a are provided for guiding the spring rail 18a. Three of the holding elements 84a, 86a, 88a, 90a, 92a, 94a are arranged on each of the limbs 78a, 80a. The in each case three holding elements 84a, 86a, 88a, 90a, 92a, 94a are formed rotationally symmetrically with respect to one another. On the central holding elements 86a, 92a in each case, there is arranged in each case in the guide grooves 98a, 104a an abutment web 108a, wherein one of the abutment webs is not visible here. The abutment webs 108a partially narrow the guide grooves 98a, 104a to such an extent that a smallest width of the guide grooves 98a, 104a is smaller than a thickness of the spring rail 18a. When the spring rail 18a is pushed into the guide grooves 98a, 104a, the abutment webs 108a are deformed slightly and bear in form-fitting and frictionally engaging fashion against the spring rail 18a. The abutment webs 108a thus eliminate a clearance between the spring rail 18a and the wiper blade adapter 10a. The abutment webs 108a are, as viewed in the wiper blade longitudinal direction 16a, arranged centrally on the wiper blade adapter 10a.

During an assembly process, the spring rail 18a is firstly pushed into the guide groove 100a of the holding element 88a. The detent means 14a is at the same time deflected out of an initial position by the spring rail 18a. The spring rail 18a is subsequently pushed through the wiper blade adapter 10a. Here, the spring rail 18a engages into the further guide grooves 96a, 98a, 102a, 104a, 106a. Here, between the at least two detent means 12a, 14a as viewed in the wiper blade longitudinal direction 16a, the wiper blade adapter 10a engages around the spring rail 18a at both sides in a plane. Furthermore, the spring rail 18a deflects the detent means 16a out of an initial position.

Figure 9:
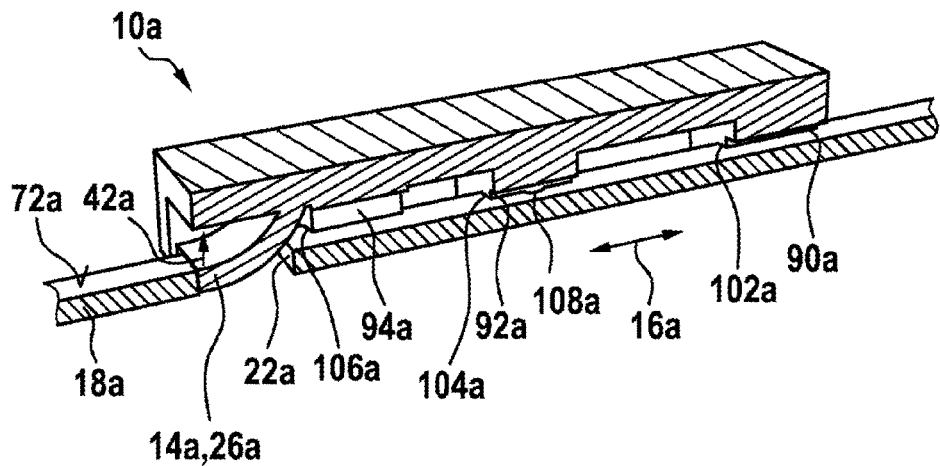
FIG. 9 shows the wiper blade device as per FIG. 8 in a further perspective partial section.
Figure 10:
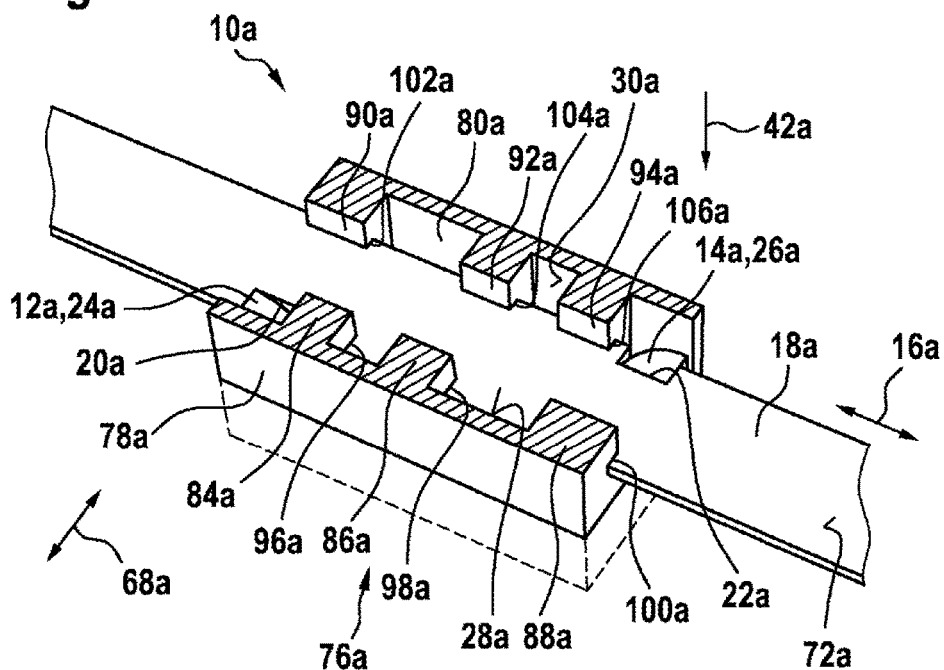
FIG. 10 shows the wiper blade device as per FIG. 8 in a further perspective partial section.

In FIGS. 9 and 10, the wiper blade device is shown in the assembled state, wherein, for the sake of clarity, only the wiper blade adapter 10a and the spring rail 18a are illustrated. After reaching the detent recess 22a, the detent means 14a moves back into the initial position. Here, the free end of the detent means 14a bears against a surface which delimits the detent recess and which is oriented in the direction of the wiper blade adapter 10a. Analogously to this, after reaching the detent recess 20a, the detent means 12a moves back into the initial position. Here, the free end of the detent means 12a bears against a surface which delimits the detent recess and which is oriented in the direction of the wiper blade adapter 10a. The form fits that are generated between the detent means 12a, 14a and the spring rail 18a thus prevent a further movement between the spring rail 18a and the wiper blade adapter 10a in the wiper blade longitudinal direction 16a.

Figure 11:
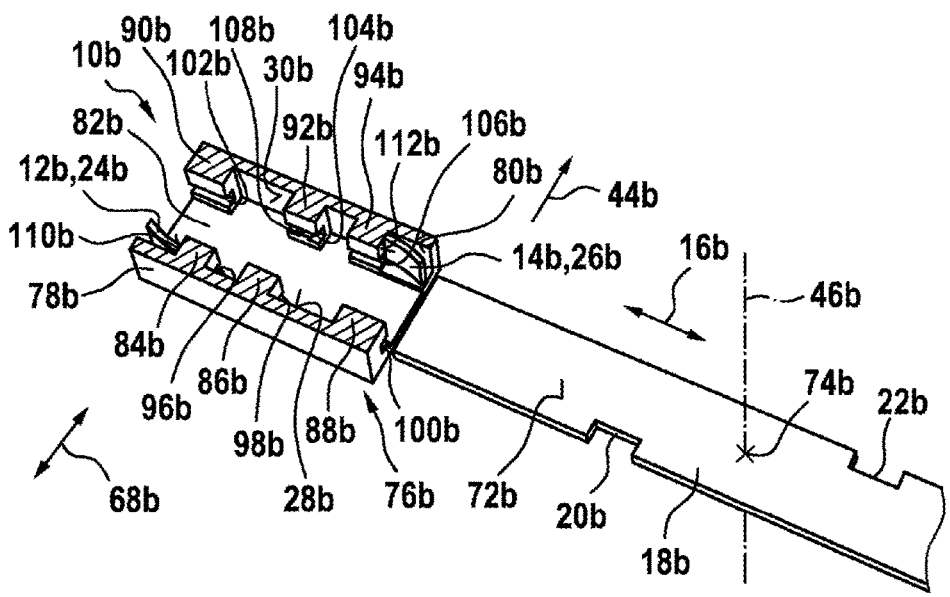
FIG. 11 shows a third exemplary embodiment of a wiper blade device in a perspective partial section.

FIG. 11 illustrates a third exemplary embodiment of a wiper blade device having a wiper blade adapter 10b and having a spring rail 18b. The wiper blade device has exactly one spring rail 18b. The spring rail 18b is formed in one piece. The spring rail 18b is formed from a coated spring steel. In an unloaded state, the spring rail 18b is substantially in the shape of a flattened curved bar. The spring rail 18b comprises two detent recesses 20b, 22b. The detent recesses 20b, 22b are arranged offset with respect to one another in a wiper blade longitudinal direction 16b. A plane moving in the wiper blade longitudinal direction 16b and extending perpendicular to the wiper blade longitudinal direction 16b firstly intersects one detent recess 20b, then neither of the detent recesses 20b, 22b, and finally the other detent recess 22b.

The wiper blade longitudinal direction 16b runs parallel to a main direction of extent of the spring rail 18b. The detent recesses 20b, 22b do not intersect any common plane oriented perpendicular to the wiper blade longitudinal direction 16b. The detent recesses 20b, 22b are arranged on mutually averted sides of the spring rail 18b. The detent recesses 20b, 22b are arranged axially symmetrically with respect to one another relative to a central axis of rotation 46b. The central axis of rotation 46b runs through a center of gravity 74b of the spring rail 18b and is oriented perpendicular to a spring rail surface 72b.

A coupling region 76b of the wiper blade adapter 10b for the coupling of the wiper arm 58 shown in the first exemplary embodiment is not shown in detail. Various structural embodiments known from the prior art are conceivable for the coupling region 76b. The wiper blade adapter 10b comprises two detent means 12b, 14b. The detent means 12b, 14b are arranged offset with respect to one another in the wiper blade longitudinal direction 16b. A plane moving in the wiper blade longitudinal direction 16b and extending perpendicular to the wiper blade longitudinal direction 16b firstly intersects one detent means 12b, then neither of the detent means 12b, 14b, and finally the other detent means 14b. The two detent means 12b, 14b are provided for being deflected in different directions 42b, 44b. The two detent means 12b, 14b are provided for being deflected at least substantially in a wiping direction 68b.

The two detent means 12b, 14b comprise in each case one deflection means 24b, 26b. The detent means 12b, 14b are in each case formed in one piece with the deflection means 24b, 26b. The deflection means 24b, 26b are arranged offset with respect to one another in the wiper blade longitudinal direction 16b. Viewed in the wiping direction 68b, the deflection means 24b, 26b are arranged offset with respect to one another. The deflection means 24b, 26b are deflectable in resiliently elastic fashion. The deflection means 24b, 26b are formed so as to be pre-bent through at least substantially 30°.

The wiper blade adapter 10b has a top wall 82b. The top wall 82b connects lateral limbs 78b, 80b of the wiper blade adapter 10b to one another. Holding elements 84b, 86b, 88b, 90b, 92b, 94b for the mounting of the spring rail 18b are arranged on different receiving sides 28b, 30b, which face toward one another, of the wiper blade adapter 10b. The holding elements 84b, 86b, 88b, 90b, 92b, 94b are formed in one piece with the limbs 78b, 80b. In the holding elements 84b, 86b, 88b, 90b, 92b, 94b there is arranged in each case one guide groove 96b, 98b, 100b, 102b, 104b, 106b. The guide grooves 96b, 98b, 100b, 102b, 104b, 106b are provided for guiding the spring rail 18b. Three of the holding elements 84b, 86b, 88b, 90b, 92b, 94b are arranged on each of the limbs 78b, 80b. The in each case three holding elements 84b, 86b, 88b, 90b, 92b, 94b are formed rotationally symmetrically with respect to one another. On the central holding elements 86b, 92b in each case, there is arranged in each case in the guide grooves 98b, 104b an abutment web 108b, wherein one of the abutment webs is not visible here. The abutment webs 108b partially narrow the guide grooves 98b, 104b to such an extent that a smallest width of the guide grooves 98b, 104b is smaller than a thickness of the spring rail 18b. When the spring rail 18b is pushed into the guide grooves 98b, 104b, the abutment webs 108b are deformed slightly and bear in form-fitting and frictionally engaging fashion against the spring rail 18b. The abutment webs 108b thus eliminate a clearance between the spring rail 18b and the wiper blade adapter 10b. The abutment webs 108b are, as viewed in the wiper blade longitudinal direction 16b, arranged centrally on the wiper blade adapter 10b.

One deflection means 24b is arranged on the holding element 84b. The other deflection means 26b is arranged on the holding element 94b. The deflection means 24b, 26b are arranged on mutually averted sides 110b, 112b of the holding elements 84b, 94b. The holding elements 84b, 94b are arranged on opposite sides of the wiper blade adapter 10b. Proceeding from the holding elements 84b, 94b, the deflection means 24b, 26b extend toward one another as viewed in the wiping direction 68b. The deflection means 24b, 26b project in each case at least substantially perpendicularly from the sides 110b, 112b of the holding elements 84b, 94b and bend in the direction of a center, viewed in the wiping direction 68b, of the spring rail 18b. Free ends of the detent means 12b, 14b point in the wiper blade longitudinal direction 16b. The free ends of the detent means 12b, 14b are averted from one another in this case. The detent means 12b, 14b form terminations of the wiper blade adapter 10b in the wiper blade longitudinal direction 16b.

During an assembly process, the spring rail 18b is firstly pushed into the guide groove 100b of the holding element 88b. The detent means 14b is at the same time deflected out of an initial position by the spring rail 18b. The spring rail 18b is subsequently pushed through the wiper blade adapter 10b. Here, the spring rail 18b engages into the further guide grooves 96b, 98b, 102b, 104b, 106b. Here, between the at least two detent means 12b, 14b as viewed in the wiper blade longitudinal direction 16b, the wiper blade adapter 10b engages around the spring rail 18b at both sides in a plane. Furthermore, the spring rail 18b deflects the detent means 16b out of an initial position.

Figure 12:
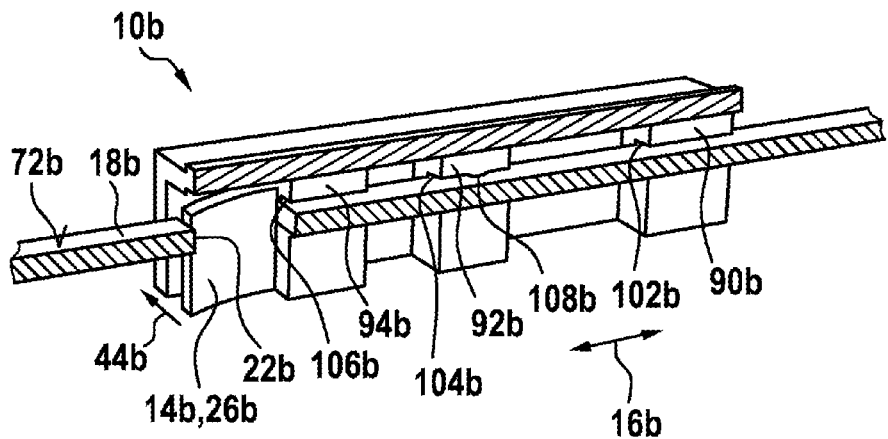
FIG. 12 shows the wiper blade device as per FIG. 11 in a further perspective partial section.
Figure 13:
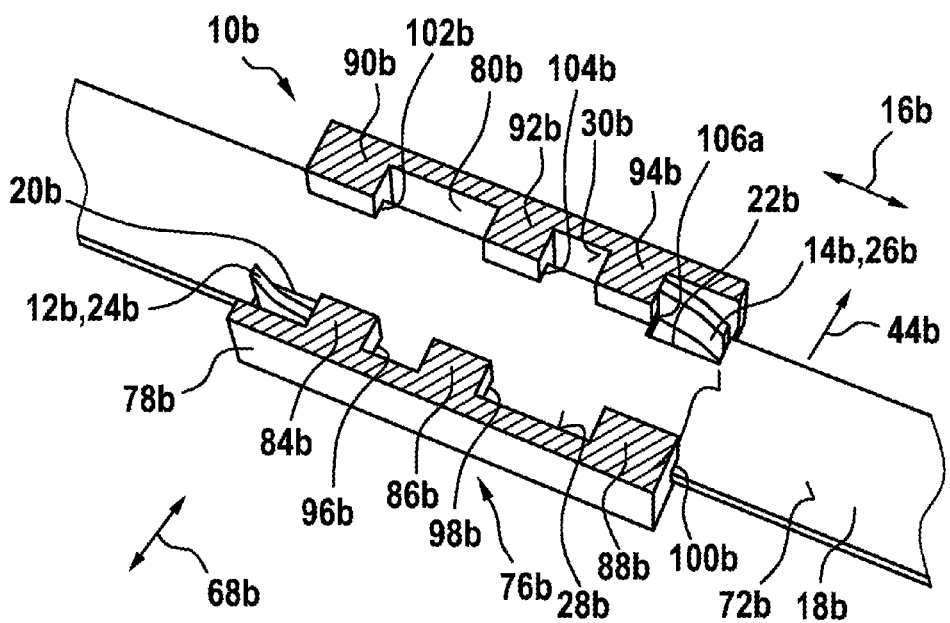
FIG. 13 shows the wiper blade device as per FIG. 11 in a further perspective partial section.

In FIGS. 12 and 13, the wiper blade device is shown in the assembled state, wherein, for the sake of clarity, only the wiper blade adapter 10b and the spring rail 18b are illustrated. After reaching the detent recess 22b, the detent means 14b moves back into the initial position. Here, the free end of the detent means 14b bears against a surface which delimits the detent recess and which is oriented in the direction of the wiper blade adapter 10b. Analogously to this, after reaching the detent recess 20b, the detent means 12b moves back into the initial position. Here, the free end of the detent means 12b bears against a surface which delimits the detent recess and which is oriented in the direction of the wiper blade adapter 10. The form fits that are generated between the detent means 12b, 14b and the spring rail 18b thus prevent a further movement between the spring rail 18b and the wiper blade adapter 10b in the wiper blade longitudinal direction 16b.

What is claimed is:

1. A wiper blade device having a wiper blade adapter (10; 10a; 10b) which comprises at least two detent means (12; 12a; 12b, 14; 14a; 14b) which are spaced apart from one another along a wiper blade longitudinal direction (16; 16a, 16b) and are also disposed on opposite lateral sides of the wiper blade adapter, the lateral sides being spaced apart from one another along a wiping direction (68) that is perpendicular to the wiper blade longitudinal direction, wherein the wiper blade device further includes at least one spring rail (18; 18a; 18b) which comprises at least two detent recesses (20; 20a; 20b, 22; 22a; 22b) which are spaced apart from one another along the wiper blade longitudinal direction (16; 16a, 16b) and are also disposed on opposite lateral sides of the at least one spring rail, wherein the at least two detent means (12; 12a; 12b, 14; 14a; 14b) are resiliently elastic and are configured to deflect and then engage, in an assembled state, into the at least two detent recesses (20; 20a; 20b, 22; 22a; 22b) of the at least one spring rail (18; 18a; 18b), wherein the at least two detent means each include an elongate arm and a protrusion at an end of the arm, wherein the protrusions are configured to engage into the at least two detent recesses.

2. The wiper blade device as claimed in claim 1, characterized in that the at least two detent means (12; 12a; 12b, 14; 14a; 14b) comprise in each case one deflection means (24; 24a; 24b, 26; 26a; 26b), which deflection means are arranged offset with respect to one another in the wiper blade longitudinal direction (16; 16a, 16b).

3. The wiper blade device as claimed in claim 1, characterized in that the at least two detent means (12; 12b, 14; 14b) comprise in each case one deflection means (24; 24b, 26; 26b), which deflection means which are arranged on the opposite lateral sides of the wiper blade adapter, wherein the opposite lateral sides of the wiper blade adapter are receiving sides (28; 28b, 30; 30b) which face toward one another, of the wiper blade adapter (10; 10b).

4. The wiper blade device as claimed in claim 1, characterized in that the wiper blade adapter (10) comprises at least one first guide groove (32) which, viewed in the wiper blade longitudinal direction (16), extends as far as between the at least two detent means (12, 14).

5. The wiper blade device as claimed in claim 4, characterized in that the wiper blade adapter (10) comprises at least one second guide groove (34) which, viewed in the wiper blade longitudinal direction (16), extends as far as between the at least two detent means (12, 14).

6. The wiper blade device as claimed in claim 1, characterized in that the wiper blade adapter (10; 10a; 10b), between the at least two detent means (12; 12a; 12b, 14; 14a; 14b) as viewed in the wiper blade longitudinal direction (16; 16a, 16b), engages around the at least one spring rail (18; 18a; 18b) at both sides in at least one plane.

7. The wiper blade device as claimed in claim 1, characterized in that the at least two detent means (12; 12b, 14; 14b) are deflectable in different directions (42; 42b, 44; 44b).

8. The wiper blade device as claimed in claim 1, characterized in that the at least two detent recesses (20; 20a; 20b, 22; 22a; 22b) of the at least one spring rail (18; 18a; 18b) are arranged on mutually averted sides of the at least one spring rail (18; 18a; 18b).

9. The wiper blade device as claimed in claim 1, characterized in that the at least two detent recesses (20; 20a; 20b, 22; 22a; 22b) are arranged axially symmetrically with respect to a central axis of rotation (46; 46a; 46b).

10. The wiper blade device as claimed in claim 1, further comprising a wind deflector unit (48) which has a spring rail channel (50) accommodating the at least one spring rail (18).

11. The wiper blade device as claimed in claim 1, wherein the at least two detent means are configured to initially deflect away from one another when the spring rail is inserted into the wiper blade adapter, and are configured to deflect toward one another prior to engaging in the at least two detent recesses.

12. The wiper blade device as claimed in claim 1, wherein wiper blade adapter includes a body having an abutment web that defines a groove having a width that is smaller than a width of the spring rail, such that when the spring rail is inserted into the wiper blade adapter, the abutment web is configured to deform to provide room for insertion of the spring rail through the wiper blade adapter.

13. The wiper blade device as claimed in claim 12, wherein the groove is a first groove, and wherein the body defines at least one additional groove configured to receive and guide the spring rail.

14. A wiper blade device having a wiper blade adapter (10; 10a; 10b) which comprises at least two detent means (12; 12a; 12b, 14; 14a; 14b) which are spaced apart from one another along a wiper blade longitudinal direction (16; 16a, 16b) and are also disposed on opposite lateral sides of the wiper blade adapter, the lateral sides being spaced apart from one another along a wiping direction (68) that is perpendicular to the wiper blade longitudinal direction, wherein the wiper blade device further includes at least one spring rail (18; 18a; 18b) which comprises at least two detent recesses (20; 20a; 20b, 22; 22a; 22b) which are spaced apart from one another along the wiper blade longitudinal direction (16; 16a, 16b) and are also disposed on opposite lateral sides of the at least one spring rail, wherein the at least two detent means (12; 12a; 12b, 14; 14a; 14b) are resiliently elastic and are configured to deflect and then engage, in an assembled state, into the at least two detent recesses (20; 20a; 20b, 22; 22a; 22b) of the at least one spring rail (18; 18a; 18b), wherein the at least two detent means each include an elongate arm and a protrusion at an end of the arm, wherein the protrusions are configured to engage into the at least two detent recesses, wherein the wiper blade adapter (10; 10a; 10b), between the at least two detent means (12; 12a; 12b, 14; 14a; 14b) as viewed in the wiper blade longitudinal direction (16; 16a, 16b), engages around the at least one spring rail (18; 18a; 18b) at both sides in at least one plane.

15. The wiper blade device as claimed in claim 14, wherein the wiper blade adapter includes a body having an abutment web that defines a groove having a width that is smaller than a width of the spring rail, such that when the spring rail is inserted into the wiper blade adapter, the abutment web is configured to deform to provide room for insertion of the spring rail through the wiper blade adapter.

16. A wiper blade device having a wiper blade adapter (10; 10a; 10b) which comprises at least two detent means (12; 12a; 12b, 14; 14a; 14b) which are spaced apart from one another along a wiper blade longitudinal direction (16; 16a, 16b) and are also disposed on opposite lateral sides of the wiper blade adapter, the lateral sides being spaced apart from one another along a wiping direction (68) that is perpendicular to the wiper blade longitudinal direction, wherein the wiper blade device further includes at least one spring rail (18; 18a; 18b) which comprises at least two detent recesses (20; 20a; 20b, 22; 22a; 22b) which are spaced apart from one another along the wiper blade longitudinal direction (16; 16a, 16b) and are also disposed on opposite lateral sides of the at least one spring rail, wherein the at least two detent means (12; 12a; 12b, 14; 14a; 14b) are resiliently elastic and are configured to deflect and then engage, in an assembled state, into the at least two detent recesses (20; 20a; 20b, 22; 22a; 22b) of the at least one spring rail (18; 18a; 18b), wherein the wiper blade adapter includes a body having an abutment web that defines a groove having a width that is smaller than a width of the spring rail, such that when the spring rail is inserted into the wiper blade adapter, the abutment web is configured to deform to provide room for insertion of the spring rail through the wiper blade adapter.

* * * * *